Sept. 2, 1930.   C. T. CABRERA   1,774,504
SEPARATION APPARATUS
Filed May 10, 1928   2 Sheets-Sheet 1
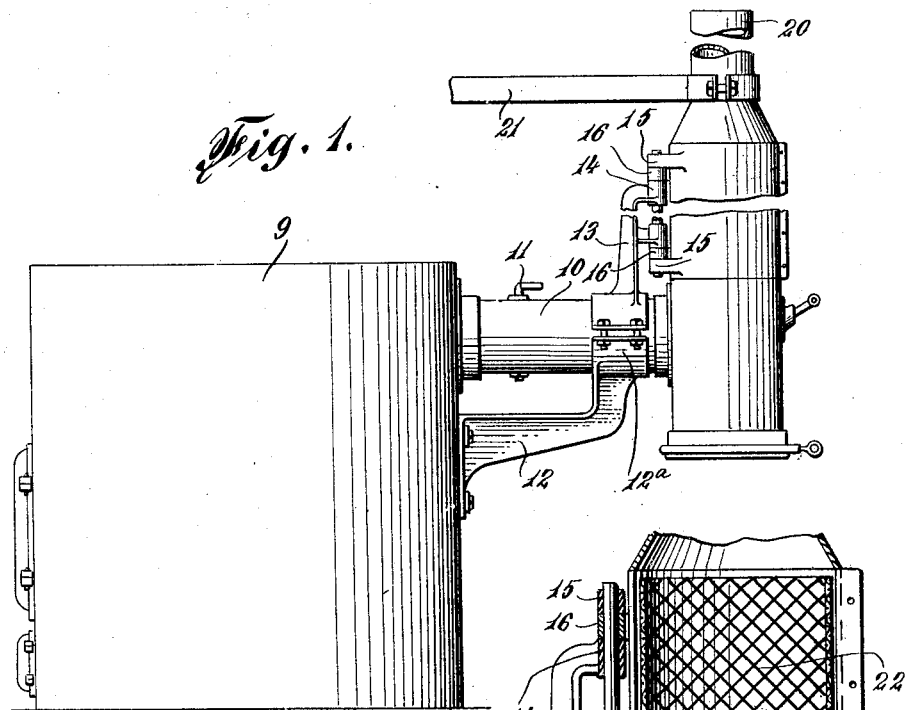
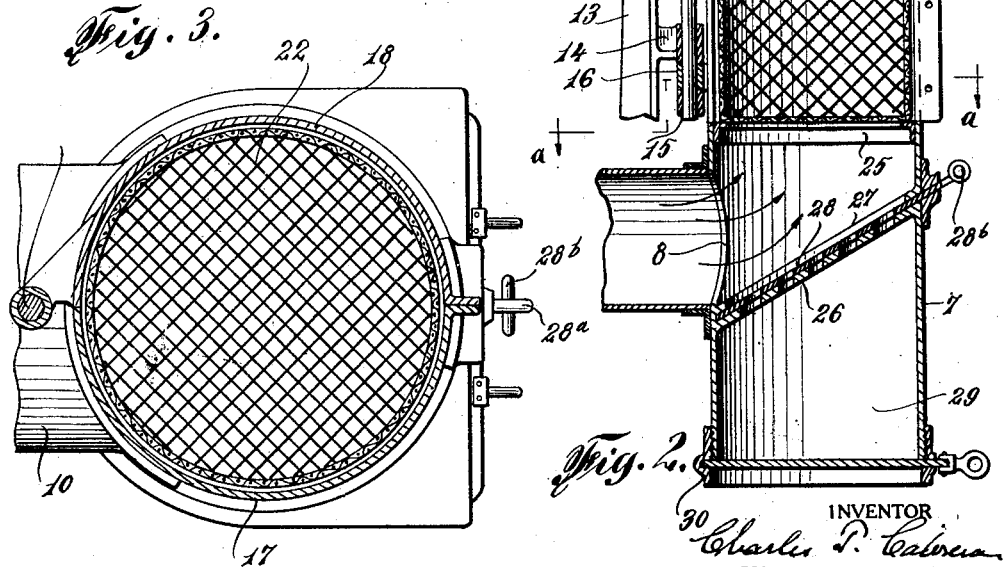

Sept. 2, 1930. C. T. CABRERA 1,774,504
SEPARATION APPARATUS
Filed May 10, 1928 2 Sheets-Sheet 2
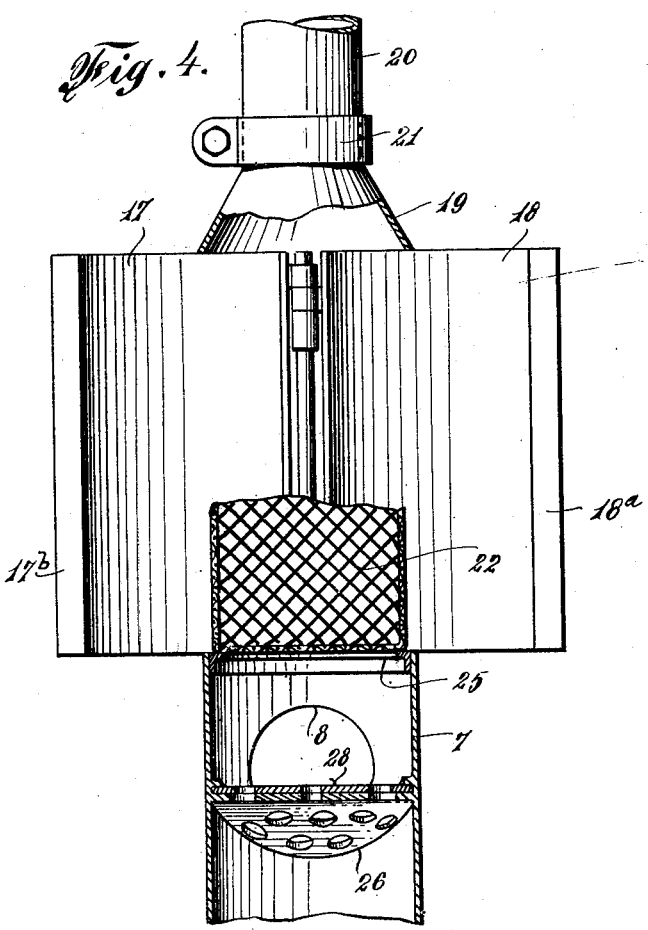
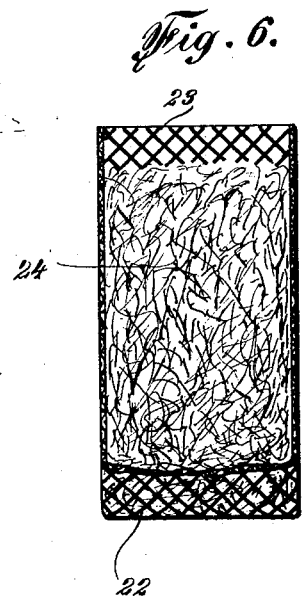
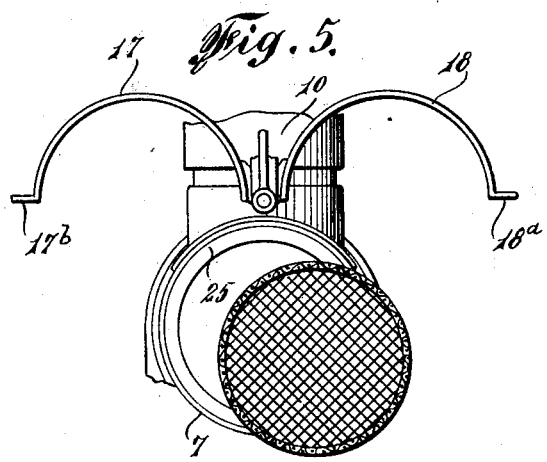
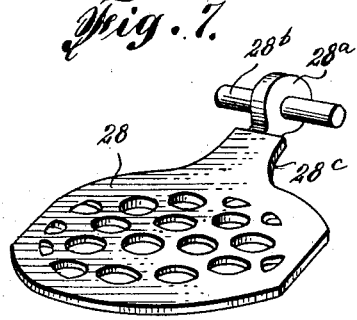
INVENTOR
Charles T. Cabrera
BY
P. Frank Daniels
ATTORNEY Patented Sept. 2, 1930

1,774,504

UNITED STATES PATENT OFFICE

CHARLES T. CABRERA, OF PHILADELPHIA, PENNSYLVANIA, ASSIGNOR TO DILUENT CORPORATION, A CORPORATION OF NEW YORK

SEPARATION APPARATUS

Application filed May 10, 1928. Serial No. 276,539.

This invention relates generally to apparatus for separation, as by filtration, and is more particularly directed to means for effecting a phase of separation in which fluids, as air gases and vapors, including smoke, as distinguished from liquids, are treated to effect their partial or complete clarification, prior to their dispersion into the atmosphere, and to collect and recover the solids or matter held in suspension therein.

As is well known, the clarification of air, gases and gaseous vapors of the minute particles of matter which remain in suspension therein, as they are emitted or expelled into the surrounding atmosphere, either under control, or otherwise, has long constituted a serious problem, not only from an economic standpoint but from sanitary considerations, as well. For example, no practical and efficient method of effecting the purification of air, as employed in heating and ventilating systems of the natural flow or pressure types has been evolved. The same is true with respect to the clarification of natural gases emitted from wells and to the vapors of various composition, commonly classified as smoke, resulting from combustion.

The primary object of this invention, therefore, is to provide a practical economic and efficient means for eliminating solids from air, gases and other vapors, including those emanating from combustion, prior to their passage or emission into a confined or an unconfined atmosphere.

More specifically, it is the object of this invention, to provide a means for separating solids in a suspended state from their vaporous or gaseous vehicles, which will have a wide range of applicability and in connection with various forms of apparatus, as are productive of objectionable solid-laden vapors or gases.

Further, it is an object of this invention to provide means for effecting the clarification of vapors and gases containing solids in suspension, as by filtering or screening, which may be readily and economically installed and operated in conjunction with existing forms of apparatus, as well as with apparatus especially designed for its use therewith.

It is also an important object to provide means as aforesaid which will not only screen or filter out of their vaporous or gaseous vehicles, all, or substantially all, solids, irrespective of their physical or chemical characteristics, but whereby this result may be attained without interference, by retardation, diffusion, or otherwise, with the natural, forced or other controlled flow of the gases or vapors under treatment, while permitting of the removal of the collected solids without affecting the normal continuous operation of the vapor producing medium with which said means are associated.

Obviously, an important desideratum in the utilization of any means as aforesaid, is simplicity in construction and operation, and in my invention I have provided means which do not involve any complicated or cumbersome mechanisms, as in the prior attempts to solve the problem to which this invention is directed, but include a minimum number of parts maintained in fixed relationship, which automatically perform their several functions, the means being accessibly associated with the vapor conducting medium for such attention as may be required from time to time, in the removal of the collected solids, cleaning and the like, which may be expeditiously and cheaply accomplished.

Other objects and advantages flowing from the practicing of my invention, will doubtless become apparent as the description proceeds, and I would have it clearly understood that I reserve unto myself all rights to the full range of equivalents of the means disclosed as well as to all uses to which my invention may be applicable, within the spirit and scope of this disclosure.

One of the greatest evils, and that which has probably received more world-wide consideration than any other problem of the kind in an effort to effect its elimination, is the pollution of the atmosphere in large cities and industrial centers, by the discharge thereinto of gaseous vapors containing solid products of combustion in varying percentages. Many forms of draft regulators and automatic stokers have been devised, different forms of fuel, manufactured and natural have been used, and, where coal is employed as a fuel, washing or other cleaning processes have been proposed. None of these methods, however, has attained the results sought, due to their inefficiency or because of their economic impracticability, and at the present time there is no means for successfully combatting this admitted grave menace to healthful living conditions.

Therefore, while it will be manifest from this disclosure that my invention is susceptible to innumerable applications in the clarification of air, gases and vapors, I will confine this description more or less to the practicing of the same as directed to means for the treatment of the vapors of combustion for the removal of the solids such as ashes, cinders, soot etc., therefrom, preliminary to their discharge or emission into the atmosphere. However, I would have it understood that this is merely for illustrative purposes and is not to be construed in any way as a limitation of the scope of my invention or of its application to this particular function.

In the accompanying drawings, I have illustrated a typical installation of a means embodying my invention in its application to the separation of the solids from the gaseous vapors of combustion. Other elements, than those shown, in the same or other relationship to one another and to the apparatus with which they are associated, may be employed to accomplish the objectives to which my invention is directed, within the spirit and scope of this invention, as defined by the appended claims.

In the drawings:

Figure 1 is an elevation of a conventional furnace with an embodiment of my invention associated therewith.

Figure 2 is a longitudinal section of a part of the structure shown in Figure 1.

Figure 3 is a transverse section on the line $a$—$a$ of Figure 2.

Figure 4 is a sectional elevation of the separating and collecting housing of the separating and collecting means, showing the hinged wall-components, thrown or folded back, as for the removal or replacement of the filtering element container, a fragment of which is illustrated.

Figure 5 is a plan view looking downwardly from the base of the conical head of the housing, with the filtering element displaced to disclose its means of support.

Figure 6 is an enlarged view, partly sectioned, of the container or shell for the filtering element, which is shown therein, and Figure 7 is a view in perspective of a perforate plate disposed below the vapor or smoke inlet of the housing and actuable to close communication between the portions of the housing on either side thereof.

Referring now to the drawings in detail, in which like characters of reference are employed to designate similar parts in the several views, 7 indicates the cylindrical wall of the lower part of the housing of the device which is provided with an annular opening 8 through which communication is established between the fire-box or combustion chamber of the furnace 9 and the filtering and collecting means, through the medium of the preferably horizontally disposed smoke pipe 10, provided with the usual draft-regulator or damper 11.

As will be observed, the end of the smoke pipe abutting upon the wall 7 is supported by a bracket 12, bolted or otherwise fixed to the furnace wall, embodying a split collar $12^a$, the separable section of which includes an integral arm or bracket 13 having vertically spaced horizontal extensions embodying bearing members 14, formed to cooperate with the complemental members 15 and 16 and the common pin $17^a$ to form a hinge mounting or connection for each of the semi-annular wall sections 17 and 18 of the housing. When closed, with their flanges $18^a$ and $17^c$ in surface contact, for locking by any suitable means, these semi-annular wall sections 17 and 18 constitute a continuation of the lower cylindrical wall 7 of the housing, the portion of the housing immediately above the hinged wall sections 17 and 18, and with which the latter likewise register, when in their enclosing position, being tapered or of a conical configuration, as at 19.

From the foregoing, it will be seen that the smoke traversing the pipe 10 will pass through the housing of the device into the stack or chimney, to which the head or upper end 19 is connectible in any suitable manner, as by a section of pipe 20, supported by a bracket 21.

Located within the housing of the filtering and collecting device, is a cylindrical shell or cartridge of wire or reticulated metallic fabric 22, preferably open at the top, as at 23, which contains the filtering or screening element 24, preferably composed of metallic shavings or turnings of any suitable width and metal, packed or bedded to a predetermined density, which will enable said element to properly perform its intended function, as hereinafter described, without interfering with the efficiency of the furnace by detrimentally affecting the draft through the stack or chimney.

The cartridge or shell 22, or cage, as it may be termed, the external diameter of which is approximately the same as that of the interior of the housing, may be of a height coextensive with that of the hinged wall sections 17 and 18 of the housing, within which it is enclosed when supported upon the shelf or internal flange 25 at the upper end of the lower wall 7 of the housing.

Spaced downwardly from the base of the shell or cartridge 22, as it is supported upon the shoulder or shelf 25, is an obliquely disposed perforate plate or surface 26, the lowest point of which is below the smoke pipe opening 8 in the housing wall 7. Suitably retained between the plate or surface 26, upon which it bears, and a ring 27, is a second perforate plate 28, the openings of which are adapted to register, in the normal operation of the device, with those in the plate or surface 26 to form a plurality of communicating passages between the section of the housing above the plate 28 and that immediately below the perforate plate or surface 26. Obviously, these plates 26 and 28 will function as a baffle, the solid-laden vapor entering from the smoke pipe 10 impinging thereagainst and being deflected upwardly, as influenced by the stack draft, the moment of inertia in the movement of the vapor, as its path is changed to the vertical, causing the heavier solids to separate therefrom and gravitate through the alined openings of the plates 26 and 28 into the chamber 29.

As the vapor ascends through the filtering element, it will be evident that it must pass through an infinite number of passages or channels of various irregular shapes and dimensions, the intertwined and massed strands presenting innumerable surfaces disposed in a multiplicity of planes and positions against which the suspended solids will impinge and whereby their continued movement with the vaporous vehicle will be arrested. In other words, the interwoven and commingled mass of fine metallic strips or strands forms a multitude of traps disposed in the path of movement of the solids carried by the vapor within which the separated solids are retained, as the vapor freed of them continues through the numerous interstices of the mass to the stack, for ultimate discharge into the atmosphere in a clear or substantially clear state, in so far as ashes, soot, cinders and other solids are concerned. The separation is also assisted by the constant weaving of the mass, due to kinetic forces induced by the fluctuations in temperature within the housing of the device.

Owing to the porous nature of the filtering element, it will be seen that while the solids will be separated from their vehicle, in an efficient manner, there will be no interruption in the flow of the vapor through the stack, the drafts of combustion being substantially the same, and controllable, as in cases where the filtering medium is omitted, and the smoke passes directly from the pipe 10 into the stack or chimney. Further, this permits the continued uninterrupted flow of the gaseous-vapors when the mass is almost completely filled with the trapped solids, so that under the usual conditions of operation of furnaces and the like, a single mass or charge of the filtering material may efficiently perform its work for a relatively long period.

However, when it is necessary to change the filtering agent, this may be readily accomplished by the substitution of a shell or cartridge containing cleaned filtering material for that which has become loaded with the collected solids. Owing to the fact that the metals used in the preparation of the filtering mass have a relatively high melting point, the shell or cartridge may be accessibly located at the base of the stack, as will be plainly evident from the foregoing description and the drawings, and is exposed for quick and easy removal from its supported position within the housing upon the throwing open of the hinged wall sections 17 and 18. Likewise, a cartridge or shell with a fresh or clean charge of filtering material may be substituted for that removed. However, prior to the opening of the hinged wall sections, for the removal of the loaded cartridge and its replacement by a freshly charged shell, the plate 28, which is provided with a grip 28$^a$, externally of the lower wall 7 of the housing, is rapidly reciprocated or agitated to cause any deposit thereon to drop through the registering openings of the superposed plates 26 and 28 into the chamber 29. Communication between the upper sections of the housing and the said chamber 29 is then cut off by sliding the plate outwardly sufficiently to have the web portions thereof overlie and seal the openings in the under plate 26. This may be accomplished by hand or by means of a suitable tool, as a hook, in engagement with the cross-member 28$^b$ of the grip 28$^a$, the base of the reduced neck portion 28$^c$ of the plate functioning as a stop to limit the outward movement of the plate, for the purpose described. Now, the sections 17 and 18 may be unlocked and swung back upon their hinges and the work of removal and replacement of the cartridge performed. When the new charge has been inserted in the housing and the hinged sections again locked in their cooperating enclosing positions, the closure 30 may be removed or opened, as by sliding it along suitable guideways, or in any other preferred manner, to obtain access to the solids deposited in the chamber 29, or this recovery step may follow the closing of communication between said chamber and the upper section of the housing and prior to the removal of the loaded shell or cartridge, it being obvious that in any event when the chamber 29 is open at the bottom, communication with the upper part of the device must be shut off. In some cases, it may be found desirable to by-pass the smoke from the pipe 10 directly to the stack or chimney above the filtering device, during the relatively brief interval in which the change in shells is being effected and the solid deposits collected or recovered.

The filtering mass may be readily cleaned, either in the shell or cartridge, or when withdrawn therefrom, by flushing with water or by chemical treatment or otherwise, when it may again be installed in functioning position within the housing, it being manifest that a single mass of filtering material under such conditions will be indefinitely re-usable.

Under certain conditions of operation, steel shavings may be found to give the most efficient results, economically and otherwise, while in other cases copper or another metal may be used in the production of the filtering agent. Again a shredded mass of non-metallic material of high thermal resistance may be used for screening or a combination of such material and metallic strands.

It will be manifest from the description of my invention, as applied to the filtering of the vapors of combustion, that it may also be just as advantageously used in screening the solids out of natural gas, by utilizing the gas pressure as the drafts of combustion are employed. Also, in heating and ventilating systems, cages containing the filtering agent may be located at the air intakes or outlets to separate out and collect the suspended solids, it being obvious that the pervious nature of the filtering element, combined with its characteristics for directing the fluid through multitudinous and devious paths, whereby the solids will be arrested and collected, will make it susceptible to innumerable uses for domestic, industrial and scientific purposes.

While I have, as before stated, confined this disclosure, in the major part, to the utility of my invention as applied to the elimination of the so-called "smoke nuisance" its applicability to the treatment of air, gases and vapors generally, as hereinbefore pointed out, will be entirely obvious.

I claim:

1. Apparatus for extracting solids from gaseous vapors comprising a vapor conduit having a removable wall section, a filtering element within said conduit opposite said removable wall section, and means within said conduit adjacent said removable wall section for supporting said filtering element.

2. Apparatus for extracting solids from gaseous vapors comprising a cylindrical vapor conduit having two complemental hingedly supported semi-annular wall sections, a foraminous container removably supported within said wall sections and extending entirely across the interior of said conduit, and a mass of shredded filtering material packed within said foraminous container.

CHARLES T. CABRERA.